United States Patent Office 3,511,040
Patented May 12, 1970

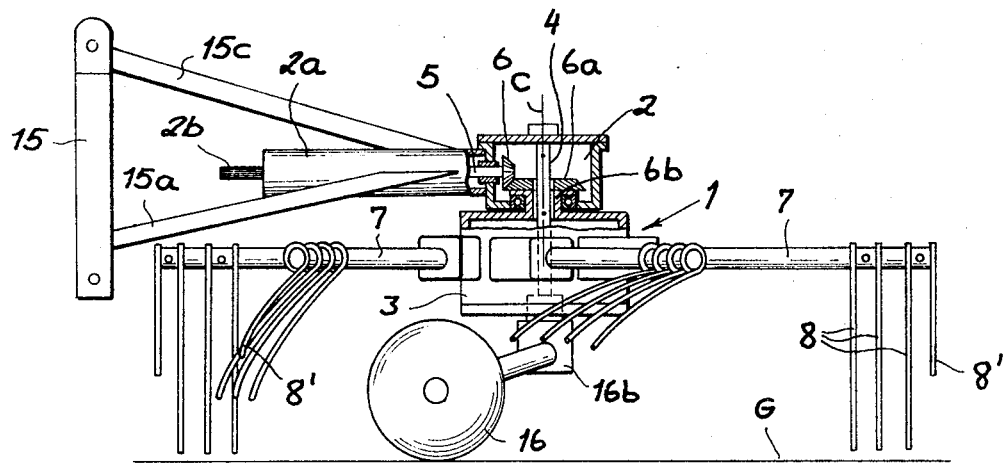
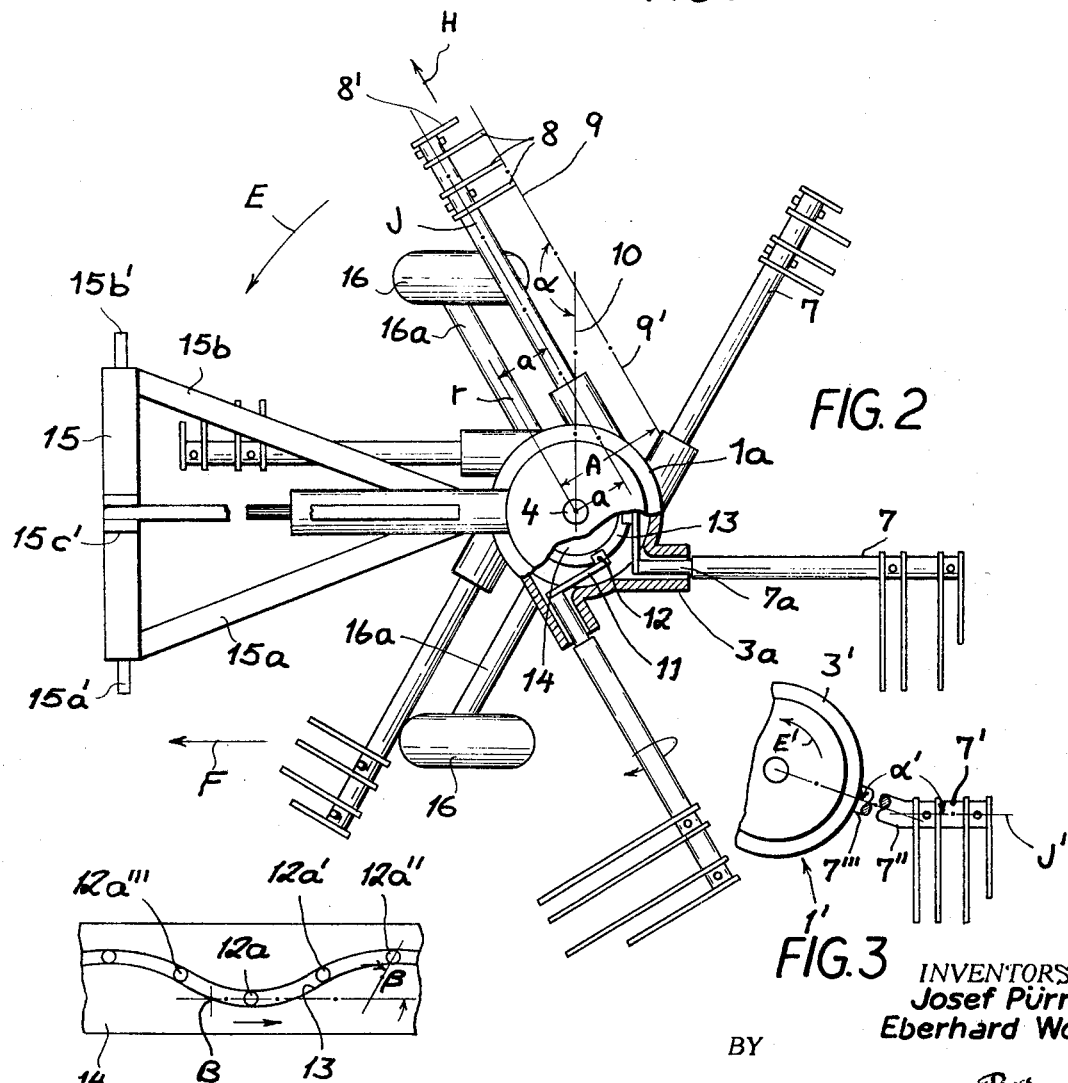

---

3,511,040
ROTARY RAKE
Josef Pürrer and Eberhard Wolf, Gottmadingen, Germany, assignors to Maschinenfabrik Fahr AG, Constance, Germany, a corporation of Germany
Filed Apr. 2, 1969, Ser. No. 812,709
Claims priority, application Germany, Apr. 3, 1968, 1,757,123
Int. Cl. A01d 79/00
U.S. Cl. 56—370                           10 Claims

---

ABSTRACT OF THE DISCLOSURE

A rotary rake drawn by a tractor or other prime mover and having a plurality of arms mounted on a rotatable body. The arms are inclined forwardly of a radius at their junction with the rotatable body in the direction of rotation to limit centrifugal spreading of the crop as the arms rotate. The arms carry rake tines at least the outer one of which projects forwardly of the remaining tines. During rotation of the rake, the tines are swung upwardly through about 90° to clear the ground and release the raked crop material in a swath.

---

The present invention relates to a rotary rake and, more particularly, to a rotary-rake assembly having a plurality of angularly spaced outwardly extending arms carrying tines engageable with the crop material on the ground for depositing same in a swath parallel to the direction of travel of the implement.

Rotary rakes for the gathering, turning, tedding and distribution of crop material, e.g. hay, in the path of travel of the implement, which may be drawn by an agricultural tractor or like-prime mover are known. In such systems, the arms extend generally radially and may be lifted from the ground and the crop material thereon to deposit the latter in a swath along the line of travel.

These systems have a tendency to disturb the swath as a result of the centrifugal forces applied to the crop material entrained by the downwardly extending rake tines carried by these arms.

In general, the tines are turned downwardly through an angular sweep of the arms in excess of 180° and grip the crop material to lift the latter upwardly onto the tines and carry it to the side of the implement at which the tines are raised, usually rearwardly in the direction of rotation of the arms, to deposit the crop material in the swath to one side of the implement.

A disadvantage of such implements is that the crop material entrained by the arms has a tendency to move upwardly along the crop-engaging surface formed by each row or array of tines on a respective arm, thereby causing the crop material to be flung to a greater or lesser extent in a direction transverse to the swath by the centrifugal force. As a consequence, the swath is built nonuniformly and, in many cases, the picked-up crop material is strewn over the previously cleared areas.

Attempts to avoid this disadvantage have concentrated upon the provision of a baffle shield or wall outwardly of the rake arms for deflecting the crop material centrifugally displaced by the arm onto the swath and thereby intercepting centrifugally displaced crop material which otherwise would be strewn over the cleared areas.

This arrangement has, however, the additional disadvantage that the impact with which the crop material is intercepted is damaging to the crop, while the arrangement does not fully prevent nonuniform building of the swath. Other disadvantages of such deflecting walls or shields are that they must be swung out of the way when the implement is to be transported along roadways and streets, and complex arrangements are necessary for supporting in this fashion, while experience has shown that such shields are disadvantageous when the implement is to be used in two directions by, for example, reverse travel, to build swaths on either side of the transport path.

It is, therefore, the principal object of the present invention to provide an improved rotary rake with reduced centrifugal displacement on the crop material and able to build more uniform swaths than prior rotary-rake arrangements.

Another object of the invention is the provision of a rotary rake which eliminates the need for a baffle or crop-catching wall and yet allows the formation of a uniform swath.

These objects and others which will become apparent hereinafter are attained in accordance with the present invention in a rotary rake having a plurality of angularly spaced, outwardly extending arms carried by rotary-rake body and formed at least on their ends with respective arrays of rake tines which extend downwardly, over at least part of the angular path, for engagement with a crop material on the ground, the arms being set forwardly in the direction of rotation of the rotary body ahead of a radius at the junction of the arm with the rotor body.

According to a more specific feature of this invention, the centrifugal force developed by the crop material engaged by the respective arrays of rakes is resolvable into a component which acts transversely to the rake plane so that, as the centrifugal force increases, the countervailing force of the rake plane resists outward movement of the crop material along the rake plane.

The rake of the present invention is free from any baffle of the type described earlier and allows clean pick up and unobjectionable formation of the swath.

In accordance with this invention, the array of rake tines at the end of each arm defines a pick-up plane or surface which intersects the axial plane of the rotary body lying along a radius thereof substantially at the junction of the arm with the rotary body in an obtuse angle open in the direction of rotation of the rotor body but less than 180°. The arms or the pick-up planes of the tines thereof thus lie along secants of the rotor body.

It has also been discovered that it is possible to further restrict the outward migration of the crop material beyond the ends of the arms under the use of centrifugal force, when at least the outermost rake tine of each array projects forwardly of the pick-up plane or surface defined by the remainder of the array. This tine is also shorter than the tines of the remainder of the array and thus serves as a rake but as a member impeding movement of the crop material outwardly therealong.

The above and other objects, features and advantages of the present invention will become more readily apparent from the following description, reference being made to the accompanying drawing in which:

FIG. 1 is a side-elevational view of an implement according to this invention, partly shown in axial cross section;

FIG. 2 is a plan view of the implement, partly broken away;

FIG. 3 is a plan view of a portion of another implement in which the offsetting of the arms is constituted by a bend therein; and FIG. 4 is a developed view of the control surface or cam operating the rake arms.

In FIGS. 1, 2 and 4 of the drawing, there is diagrammatically shown a rotary rake body as represented at 1 and is formed with a nonrotatable housing 2 containing a transmission for driving the arms 7 of the rake which extend outwardly from a hub 1a carrying these arms. The hub 1a also includes a control housing 3 and is rotatably mounted on a vertical and nonrotatable shaft 4 the axis of which is represented at C and lies perpendicular to the ground plane G on which the implement rides via wheels 16 of the support. The wheels 16 are in turn rotatable upon a pair of forwardly extending axles 16a supporting the carriage or boss 16b in which the shaft 4 is mounted.

The hub 1a and the housing 3 are also rotatable with respect to the housing 2 which is mounted at the end of a hollow sleeve 2a through which the drive shaft 5 extends. The free end of this drive shaft extends outwardly of the sleeve 2a and is splined, as represented at 2b, for driving connection to the power take off shaft of the tractor which draws the implement in the direction of arrow F (FIG. 2). The sleeve 2a has a pair of lower struts 15a and 15b anchored to a frame 15 and an upper strut 15c runs to the top of the latter so that the pins 15a' and 15b' of the frame and the lug 15c' thereof can be pivotally linked to the three connecting hooks or shackles of a three-point linkage of the tractor.

The shaft 5 is journaled in the sleeve 2a and extends into the drive housing 2 which encloses a bevel gear 6 rigid with the shaft 5 meshing with a bevel gear 6a connected via the hollow shaft 6b surrounding the axle 4 with the housing 3 for rotating the latter.

The arms 7 which extend outwardly from the hub 1a and the housing 3 are formed as supports for an array of tines 8 which together define a crop-entraining surface 9, the tines 8 being anchored to the respective supports by a system of the type illustrated and described in the commonly assigned copending application Ser. No. 715,649 filed Mar. 25, 1968, or any conventional structure for like purposes. As can be seen from FIG. 2, the imaginary crop-entraining surface 9 is somewhat curved in accordance with the curvature of the array of tines 8 so as to be concave forwardly in the sense of rotation of the arms 7 as represented by the arrow E in FIG. 2. The outermost tine 8' of each array is somewhat shorter and, as can be seen in FIG. 1, lies forwardly of the surface 9 to impede outward movement of the crop material in the direction of arrow H (FIG. 2). The arms 7 are rectilinear and lie along tangents to a circle of radius $a$ so that their axes J form secants of the hub. Each arm 7 has a reduced-diameter step 7a rotatably received in a tangential sleeve 3a of the housing 3 and carries a radial arm 11 provided with a cam-follower roller 12 riding along a cam 13 fixed to the shaft 4 and represented in developed form in FIG. 4.

As a result of the generally tangential orientation of the sleeve 3a and the rake-carrying arms 7, the entrainment surface 9 of each array of rakes intersects the radially extending axially vertical plane 10 of the rake body 1 at its imaginary extension 9' shown in dot-dash lines, in an obtuse angle $\alpha$ of less than 180° and open forwardly in the sense of rotation of the rake body (arrow E). This obtuse angle $\alpha$ should be approximately $150° \pm 20°$. Furthermore, the plane of the crop-entraining surface is set back from a radius $r$ from the axis C by a distance A while the axis J of the arm 7 is set back by the previously mentioned radius $a$. The radius $r$, the axis J and the crop entraining plane 9 of each array of rake tines are parallel to one another as illustrated in FIG. 2.

As noted earlier, the cam-follower levers 11 of each arm 7 bears with its roller 12 on the cam 13 and is tangential to the cam disk 14 carrying the undulating surface 13. As can be seen from FIG. 4, the cam 13 is so shaped that the arrays of rake tines 8 and the crop-entraining surfaces 9 of each arm 7 is swung upwardly about the longitudinal axes J of these arms through an angular displacement thereof of somewhat under 180° as the arms pass onto the left side of the implement facing in the direction of travel (arrow F). The angular displacement of the arms and their arrays of rake tines proceeds through an angle $\beta$ of about 90°, the axis J of the arm provided with the roller 12a being represented at B in FIG. 4. Successive positions of the roller are represented at 12a, 12a' ... 12a'' in this figure.

The apparatus may be constructed in accordance with the modification of FIG. 3, in which the arm has an initial portion 7''' extending radially from the housing 3' and rotatable by a cam arrangement as previously described. An elbow 7'' close to the free end of the arm turns the free end 7' forwardly so that the axis J at this free end lies along a secant of the hub as previously described, the direction of rotation being represented by arrow E'. The rake tines 8 and 8' are provided on the free end 7' of the arm as previously indicated. In this case, the angle $\alpha'$ is formed between the free end 7' and the radial portion 7''' of the arm.

In either case, during rotation of the rake body 1 or 1' and forward movement of the tractor (arrow F), the rake tines 8 are swung downwardly as each arm passes from the left to the right side of the machine facing in the direction of travel. The rakes engage the crop material and form a pocket therefor by virtue of the obtuse angle previously mentioned, thereby preventing centrifugal force from casting the raked crop material toward the left side of the machine at which the rakes are swung upwardly and rearwardly (with reference to the sense of rotation) to deposit the crop material in a swath.

We claim:

1. A rotary rake comprising:
    support means defining a generally upright axis of rotation and displaceable horizontally along the ground:
    a rake body rotatable on said support means about said axis and formed with a plurality of angularly spaced, outwardly extending rake arms;
    respective arrays of rakes tines mounted on said arms at least in the region of the face of the free ends thereof, said arrays defining crop-entraining surfaces intersecting a generally radial plane of said axis in the region from which the respective arm extends in an obtuse angle of less than 180° and open in the direction of rotation of said body; and
    means for swinging each array into and out of engagement with crop material on the ground as said body is rotated about said axis.

2. The rotary rake defined in claim 1 wherein at least the free end of each arm has an axis parallel to the said surface of the corresponding array of rake tines and to a radius from said upright axis, the perpendicular distance A between the radius from said upright axis to said surface associated with each arm being greater than the perpendicular distance to said axis of the free end thereof.

3. The rotary rake defined in claim 2 wherein said arms are rectilinear and are mounted on said body for rotation about respective axes lying along secants of said body.

4. The rotary rake defined in claim 2 wherein said arms have inner portions extending radially outwardly from said body and forwardly bent outer portions defining said angle with said inner positions.

5. The rotary rake defined in claim 2 wherein at least the outermost tine of each of said arrays of tines is bent forwardly of the remaining tines of the corresponding array in the sense of rotation of said body.

6. The rotary rake defined in claim 5 wherein each of said outermost tines is shorter than the remaining tines of the corresponding array.

7. The rotary rake defined in claim 2 wherein said rake body comprises a hub formed with a control housing, said means for swinging each array including a cam fixed on said support means, and a respective cam follower connected with each arm and engaging said cam for swinging said arms about respective generally horizontal axes.

8. The rotary rake defined in claim 7, further comprising a hitch connected with said support means for enabling same to be affixed to a tractor, and drive means for rotating said housing about said generally upright axis.

9. The rotary rake defined in claim 8 wherein said support means includes a vertical shaft, a carriage supporting said shaft, and wheel means of said carriage and riding on the ground, said drive means including a transmission housing mounted on said hitch, a power shaft extending into said transmission housing and bevel gear means in said transmission housing connected to said power shaft and to said rake body.

10. The rotary rake defined in claim 9 wherein each of said arrays includes at least three rake tines depending from the respective arm and bent with similar curvature with a concavity in the direction of rotation of said body, and an outermost tine bent forwardly of the remaining tines of each array and shorter than said remaining tines.

References Cited

UNITED STATES PATENTS

| 84,257 | 11/1868 | Burt et al. | 56—370 |
| 458,093 | 8/1891 | Boals | 56—370 |

FOREIGN PATENTS

| 450,793 | 4/1968 | Switzerland. |
| 458,822 | 8/1968 | Switzerland. |
| 458,823 | 8/1968 | Switzerland. |
| 459,641 | 9/1968 | Switzerland. |

F. BARRY SHAY, Primary Examiner

J. A. OLIFF, Assistant Examiner